(12) United States Patent
Clement et al.

(10) Patent No.: US 12,242,822 B2
(45) Date of Patent: *Mar. 4, 2025

(54) CUSTOM MODELS FOR SOURCE CODE GENERATION VIA PREFIX-TUNING

(71) Applicant: MICROSOFT TECHNOLOGY LICENSING, LLC., Redmond, WA (US)

(72) Inventors: Colin Bruce Clement, Seattle, WA (US); Neelakantan Sundaresan, Bellevue, WA (US); Alexey Svyatkovskiy, Bellevue, WA (US); Michele Tufano, Bellevue, WA (US); Andrei Zlotchevski, Brossard (CA)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,214

(22) Filed: Mar. 13, 2024

(65) Prior Publication Data

US 2024/0220215 A1    Jul. 4, 2024

Related U.S. Application Data

(63) Continuation of application No. 17/535,391, filed on Nov. 24, 2021, now Pat. No. 11,947,935.

(51) Int. Cl.
*G06F 9/44* (2018.01)
*G06F 8/35* (2018.01)
*G06N 3/084* (2023.01)
*G06N 3/048* (2023.01)

(52) U.S. Cl.
CPC ............... *G06F 8/35* (2013.01); *G06N 3/084* (2013.01); *G06N 3/048* (2023.01)

(58) Field of Classification Search
None
See application file for complete search history.

(56) References Cited

U.S. PATENT DOCUMENTS

| 2022/0129747 | A1* | 4/2022 | Cetintas | G06N 3/08 |
| 2022/0138552 | A1* | 5/2022 | Wong | G06N 3/04 |
| | | | | 706/12 |
| 2022/0222529 | A1* | 7/2022 | Wang | G06N 3/045 |
| 2022/0398462 | A1* | 12/2022 | Clement | G06N 3/088 |
| 2023/0115321 | A1* | 4/2023 | Vu | G06N 3/084 |
| | | | | 704/232 |

OTHER PUBLICATIONS

CN112732264, English texts (Year: 2021).*
Li et al. Prefix-Tuning: Optimizing Continuous Prompts for Generation (Year: 2021).*
Lester et al. ("The Power of Scale for Parameter-Efficient Prompt Tuning," Sep. 2021 (Year: 2021).*
Liu et al. ("AutoFreeze: Automatically Freezing Model Blocks to Accelerate Fine-tuning," Apr. 2021 (Year: 2021).*

* cited by examiner

*Primary Examiner* — Insun Kang

(57) ABSTRACT

Custom source code generation models are generated by tuning a pre-trained deep learning model by freezing the model parameters and optimizing a prefix. The tuning process is distributed across a user space and a model space where the embedding and output layers are performed in the user space and the execution of the model is performed in a model space that is isolated from the user space. The tuning process updates the embeddings of the prefix across the separate execution spaces in a manner that preserves the privacy of the data used in the tuning process.

20 Claims, 6 Drawing Sheets

CUSTOM MODELS FOR SOURCE CODE GENERATION VIA PREFIX-TUNING

CROSS-REFERENCE TO RELATED APPLICATIONS

The present application is a continuation of U.S. application Ser. No. 17/535,391 filed on Nov. 24, 2021, entitled, "Custom Models For Source Code Generation Via Prefix-Tuning," which is incorporated by reference in its entirety.

BACKGROUND

Deep learning models are used often to solve a variety of problems. Deep learning models employ neural networks that are trained to learn to recognize patterns and make predictions. One drawback of these models is the extensive amount of time and resources needed to train a deep learning model. A model may require a training dataset of real-world data consisting of several million data samples mined from various sources. The training itself may take days to weeks of computing time to train the model. Neural networks are trained iteratively, making multiple passes over the training dataset before converging to a minimum. The training is iterative and the entire training dataset is passed through the neural network in multiple iterations to find the hyperparameters (e.g., model architecture, vocabulary encoding procedures, training objective, data normalization) that meet a target objective.

In order to reduce the training time and cost in developing a deep learning model, fine-tuning is often utilized to generate a model tailored for a particular downstream task in a shorter time span. Often in fine-tuning, all the parameters of the deep learning model are updated when the model is trained on the downstream task. This requires storing the gradients and optimizer states for all parameters during the fine-tuning process. This becomes impractical when the model utilizes a large number of parameters and there are limited computing resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A custom deep learning model is developed by tuning a previously trained or pre-trained deep learning model to optimize a prefix while freezing the model parameters of the pre-trained deep learning model. The tuning process is distributed across a user space and a model space where the embedding and output layers of the pre-trained deep learning model are located in the user space and the transformer blocks are executed in the model space that is isolated from the user space. The tuning process updates the embeddings or weights of the prefix across the separate execution spaces in a manner that preserves the privacy of the data used in the tuning process.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
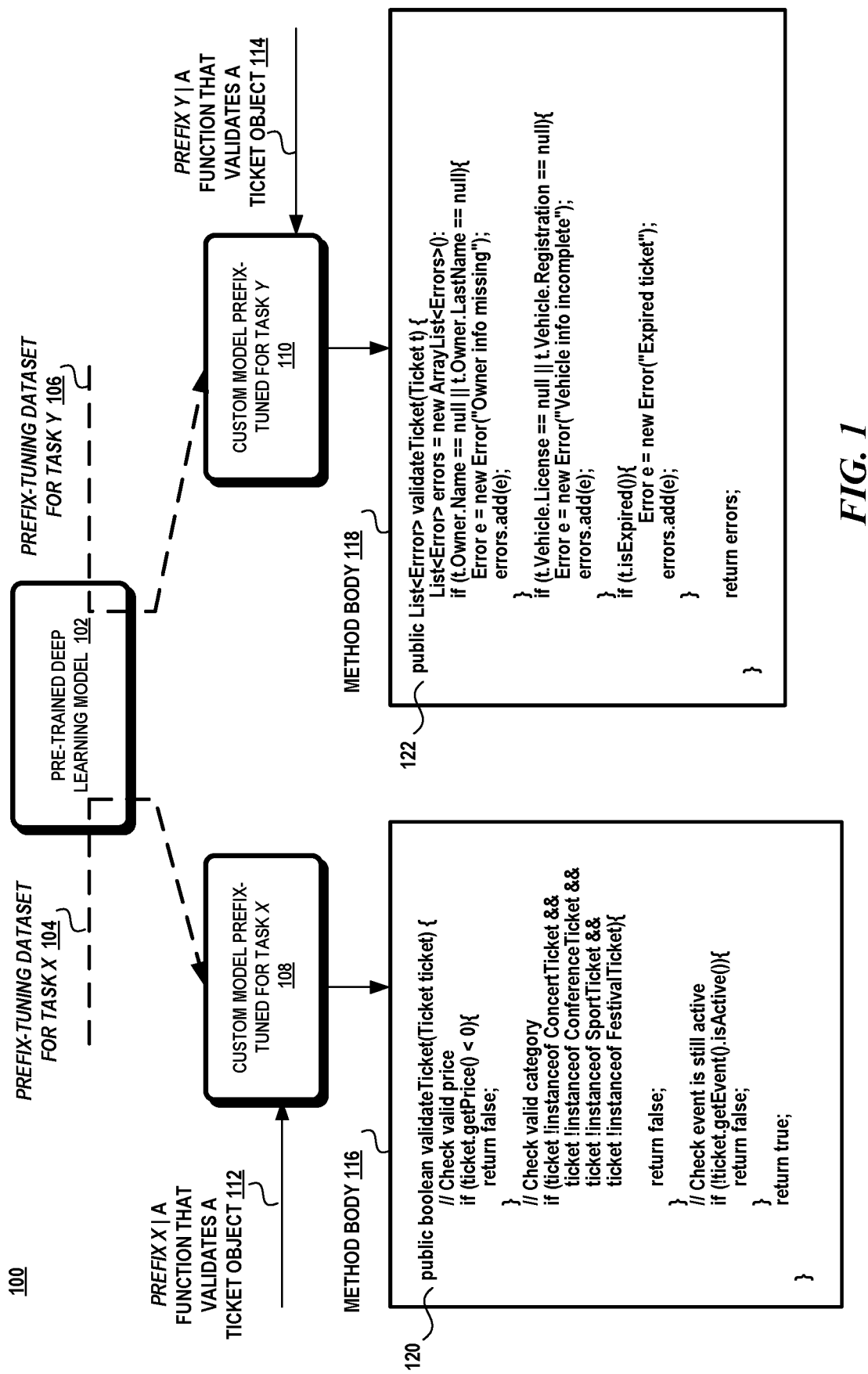
FIG. 1 is a schematic diagram illustrating prefix-tuning for a code generation task.

A deep learning model, previously trained to perform a source code generation task, is customized for a related downstream task by tuning a small continuous task specific vector or prefix while freezing the model's parameters. The prefix is a set of trainable parameters (i.e., virtual tokens, free parameters) whose embeddings or weights are learned by tuning the model with a tuning dataset configured for the downstream task. The prefix is different from the model's parameters and the subtoken and positional embeddings. The size of a prefix is a small fraction of the total size of the input sequence dimension. The tuning process only optimizes the prefix embeddings instead of all of the model parameters thereby reducing the size of the custom model.

The use of a prefix is advantageous when several custom models are generated from a single pre-trained deep learning model. The prefix differs from the prompt used in prompt tuning since the prefix does not correspond to the real subtokens of the model's vocabulary. By contrast, a prompt or control code is a set of subtokens inserted into the training data to specify a given task or domain with natural language text.

A deep learning model may be generated for various types of source code generation tasks, such as, without limitation, generating source snippets from natural language descriptions, generating unit test cases from a focal source code method under test, and generating source code repair patches from buggy source code. The prefix-tuning discussed herein is described with respect to the generation of a custom deep learning model that generates method bodies given a docstring. However, it should be noted that the techniques described herein are not limited to method body generation task described herein.

In one aspect, the deep learning model is a neural transformer model with attention. Deep learning models differ from traditional machine learning models. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, support vector machines, and visual data mapping. Deep learning differs from traditional machine learning since it uses multiple stages of data processing through many hidden layers of a neural network to learn and interpret the features and the relationships between the features. Deep learning embodies neural networks which differs from traditional machine learning techniques that do not use neural networks.

A neural transformer model with attention is one type of deep learning model that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of the method bodies. It should be noted that the term neural transformer model with attention and neural transformer model are used interchangeably.

There are different configurations of a neural transformer model. In one aspect, the customization techniques are applied to an encoder-decoder configuration of a neural transformer model. The encoder-decoder neural transformer model is used for machine translation tasks (i.e., sequence-to-sequence task) that translate an input sequence of one domain into an output sequence of a second domain, where a domain is a specific field or subject. A machine translation model learns a function that translates an input sequence into an output sequence.

In the context of code generation, the encoder-decoder neural transformer model is trained to translate a source code snippet of a first domain into a source code snippet of a second domain. A source code snippet includes a docstring (i.e., code summarization) of a method. For example, the model may be trained to translate a method signature (first domain) into a documentation string (second domain) for the method signature, translate a method signature (first domain) into a corresponding method body (second domain), translate a documentation string for a method (first domain) into the source code of the method body (second domain), translate a method body (first domain) into a method signature (second domain), translate a documentation string for a method body (first domain) into a method signature (second domain), translate a buggy source code snippet (first domain) into a repair patch for the buggy source code (second domain), and so forth.

Data privacy is a challenge and risk associated with the development of a deep learning model and its usage. In some situations, the model is provided by a third-party web service that tunes the model with tuning data from a customer reluctant to disclose the raw data of the tuning data and the predictions. The tuning dataset and the prediction results may be inadvertently released during the tuning stage of a model. In order to account for this privacy risk, a portion of the tuning process is performed in a user space and another portion of the tuning process is performed in a model space. The user space and the model space are in different execution environments. The model space has no access to the raw user data of the tuning dataset and prediction results in order to prevent the inadvertent disclosure of the private data contained therein.

Turning to FIG. 1, there is shown a schematic diagram 100 illustrating the custom tuning process. The pre-trained deep learning model 102 is trained on a generic dataset of source code and/or natural language text to learn the structure and semantics of source code. The pre-trained deep learning model 102 is then tuned to produce two custom models 108, 110 where each custom model 108, 110 predicts or generates a method body for a particular organization (i.e., project, user, domain, enterprise, etc.). Custom model 108 is trained on prefix-tuning dataset, X, 104, and custom model 110 is trained on prefix-tuning dataset, Y, 106, where X represents source code from a first customer organization and Y represents source code from a second customer organization.

For example, prefix-tuning dataset X 104 may include source code samples from an event planning company where the source code manages the organization and sale of events such as concerts, sport competition, festivals, and conferences. Prefix-tuning dataset Y 106 may include source code samples from a local municipality that manages and stores records of traffic violations.

During tuning, each input sequence of a respective prefix-tuning dataset is prepended with a prefix, Prefix X or Prefix Y, before a respective source code sample. The prefix does not correspond to the subtokens of the model's vocabulary, rather the prefix is used to steer the model. At the end of the tuning process, the prefix embeds the properties of the source code of a specific organization such as a domain, coding style, organizational conventions and rules, project APIs, etc., so the model learns the nuances of the syntax and semantics of the source code of the organization.

For example, the source code element (i.e., variable, method, expression, class, object, etc.) "ticket" in the source code of prefix-tuning dataset X 104 is used in a different context than the source code element "ticket" in the source code of prefix-tuning dataset Y 106. The source code element "ticket" in the source code of prefix-tuning dataset X 104 refers to an event ticket, such as a concert or conference, and the source code element "ticket" in the source code of prefix-tuning dataset Y 106 refers to a traffic violation, such as a speeding ticket.

During inference, each model is given an input sequence 112, 114 (e.g., docstring) along with a respective prefix which will augment the model's parameters and effectively transform the pre-trained model into a customized model for the datasets X and Y. Each model predicts a corresponding method body. The predicted source code output from each model 108, 110 differs. For example, given the docstring "A function that validates a ticket object, making sure it is valid and correct in all its aspects", the method body predicted from custom model 108 is shown as method body 116 and the predicted method body 118 from custom model Y 110 is shown as source code snippet 118.

It is worth noting the differences in each of these outputs. Each method body 116, 118 has a different coding style. The source code style of method body 116 uses longer identifiers and the source code style of method body 118 uses shorter identifiers. For example, the method signature 120 of method body 116 uses the full identifier name "ticket" while in the method signature 122 of method body 118 uses the shorter variable "t". Additionally, the "Ticket" objects have different methods and properties and each "validateTicket" method returns different values, which are in accordance with the codebase conventions learned from the tuning datasets, 104, 106.

Attention now turns to a more detailed description of the system, components, and methods for generating and deploying custom models for source code generation.

System

Figure 2:
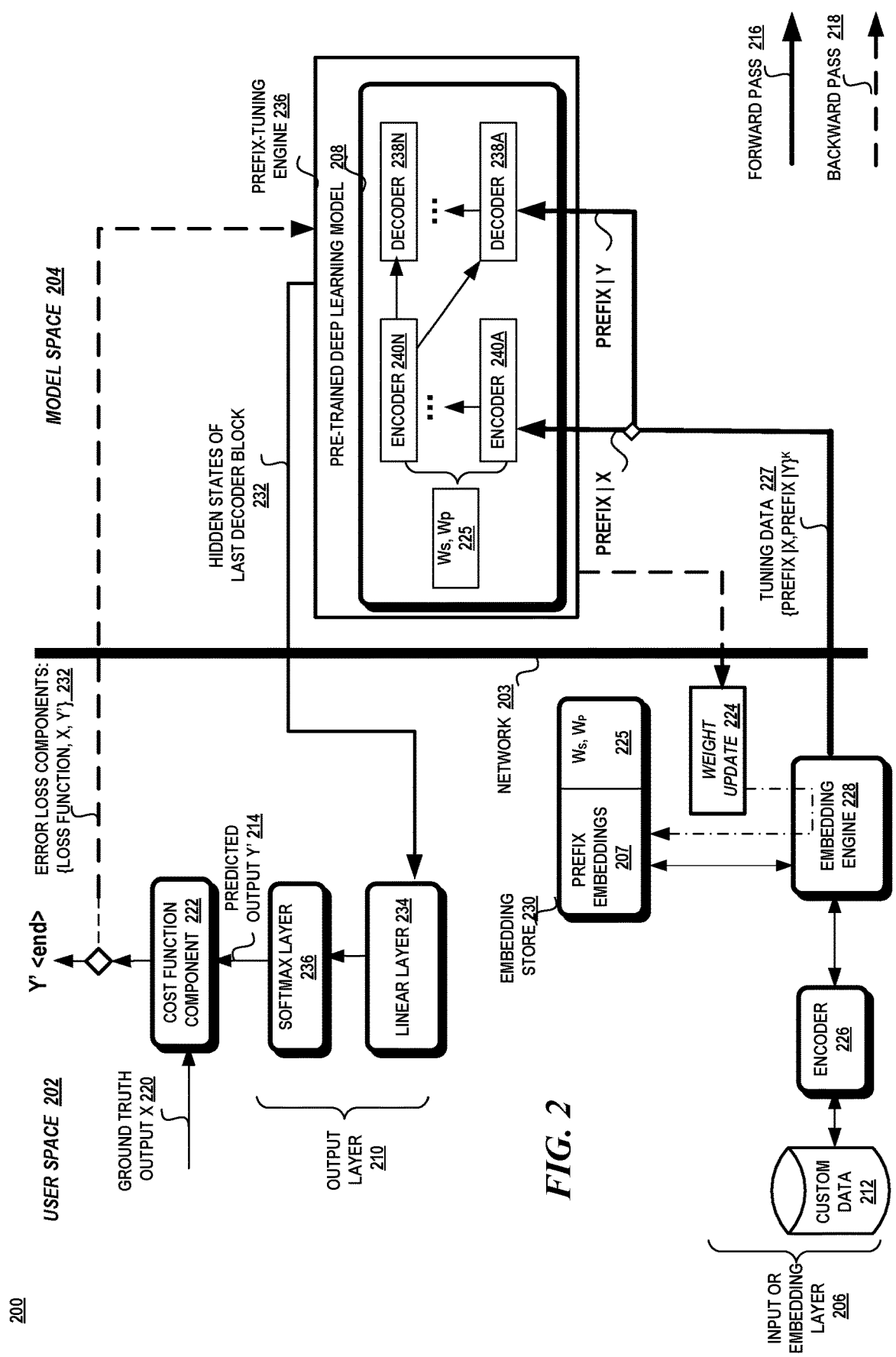
FIG. 2 is a schematic diagram illustrating an exemplary prefix-tuning system for generating custom models for source code generation.

Turning to FIG. 2, there is shown an exemplary configuration of a system 200 for generating custom models for source code generation. The system 200 is described with respect to training a sequence-to-sequence neural transformer model with attention. It should be understood that the techniques described herein are not limited to this particular type of model and that the techniques may be applied to other configurations of a neural transformer model with attention and other types of deep learning models.

The system 200 is configured with an input or embedding layer 206 executed in a user space 202, the model 208 executed in a model space 204, and the output or head layer 210 executed in the user space 202. In this configuration, the raw custom data 212 is kept in the user space 202 and not seen in the model space 204 and the predicted outputs 214 are computed in the user space 202. The user space 202 and the model space 204 are in separate execution environments. In one aspect, the execution environments may be separate computing devices interconnected by a network 203, where one computing device represents the user space 202 and a distinct computing device represents the model space 204. In another aspect, the execution environments may be in separate virtual machines that reside on a same computing device without any sharing of computing resources.

This configuration uses three data flows to tune the model: a forward pass 216, a backward pass or backpropagation pass 218, and a weight update pass 224. In the forward pass 216, the model 208 is tuned on the tuning dataset 227 and a predicted output 214 is generated which is compared to a ground truth output 220. A cost function component 222 calculates a penalty for any deviation between the predicted output 214 and the ground truth output 220. In the backward pass or backpropagation pass 218, the partial derivatives of the loss function are calculated for each trainable parameter or weight of each layer of the model. The last pass is the weight update pass 224 where the prefix embeddings are updated based on the backpropagated gradients.

The input layer 206 is the embedding layer of the model. The input or embedding layer turns subtokens of the input into their corresponding embeddings. An embedding is a learned representation for the text-based tokens/subtokens where a token/subtoken that has a common meaning is given a common representation. An embedding is a mapping of discrete categorical variables to a vector of continuous numbers. There is an embedding for each subtoken in the vocabulary and a corresponding positional embedding.

The subtoken embeddings and positional embeddings are obtained from the pre-trained deep learning model and kept frozen during the prefix-tuning process. The embedding store 230 contains the subtoken embedding matrix, Ws, and the positional embedding matrix, Wp, 225. The subtoken embedding matrix, Ws, contains a vector for each token/subtoken in the model's vocabulary. The size of the subtoken embedding matrix is the vocabulary size multiplied by the embedding dimension. The embedding dimension is the size of vector of real numbers that represents each unique token/subtoken.

Neural transformer models rely on positional embeddings to model the dependency between the tokens/subtokens at different positions in a sequence. A positional embedding encodes the absolute positions from 1 to the maximum sequence length T. Each position has an embedding vector that represents how a token/subtoken at one position attends to another token in a different position. The positional embedding matrix, Wp, is obtained from the pre-trained deep learning model and froze during the prefix-tuning process.

The embedding store 230 also contains the prefix embeddings 207. Initially, the prefix embeddings 207 are initialized with random values and then updated during backpropagation with learned values during the weight update process 224.

The input layer 206 includes the custom data 212 that is used to tune a model, an encoder 226, an embedding engine 228, and the embedding store 230. The custom data 212 includes source code files from which source code snippets are extracted to tune the model for a particular task. The custom data 212 contains the raw data of a user (i.e., developer, customer, client) that may need to be kept private due to the privacy concerns of the user or due to privacy laws or regulations.

In an aspect where the model is a sequence-to-sequence neural transformer model, the input training data consists of pairs of source code samples or snippets, where one part of the pair is a source code snippet of a first domain and the second part of the pair is a corresponding source code snippet of the second domain. The source code snippet of the first domain is transformed into a sequence of tokens representing the sequence of the first domain, $X=\{x_1, \ldots x_T\}$, and the source code snippet of the second domain is transformed into an ordered sequence of tokens representing the sequence of the second domain $Y=\{y_1, \ldots, y_T\}$, where T is the sequence length.

Each source code snippet is parsed into a parse tree or concrete syntax tree. An encoder 226, such as a byte-level byte-pair encoder, is used to extract T-ordered sequences of source code tokens or subtokens from the concrete syntax tree, where T is the maximum content length. Some tokens may be split into subtokens that are subunits of a token that appear frequently in other tokens. In one aspect, byte-level byte-pair encoding (BPE) is used to generate the vocabulary used by the neural transformer model with attention.

A prefix is prepended to each part of a training sample. The embedding engine 228 maps the T-ordered sequences of prefix/subtokens into numeric vectors and then into respective prefix, subtoken and positional embeddings. The embeddings are obtained from the embedding store 230.

During tuning, the subtoken embeddings and corresponding positional embeddings of the source code snippet of the first domain are added to form a context tensor that is applied to the first encoding layer of the model. The subtoken embeddings and corresponding positional embeddings of the source code snippet of the second domain are added to form a context tensor that is applied to the first decoding layer of the model during training.

The model space 204 includes an execution environment separate from the user space in which the deep learning model operates. The model space 204 may be part of a web service that offers access to a pre-trained neural transformer model for tuning the model for a particular task. In one aspect, the pre-trained model is trained on natural language text and source code snippets from various source code files from the same programming language. Since the model has been previously trained, the model contains the learned subtoken and positional embeddings.

The output of the model is a vector of floating-point numbers or set of hidden states of the last decoder block 232 which is transmitted to the output layer 210 of the user space 202. The output layer 210 includes a linear layer 234 and a softmax layer 236 that generates the predicted output 214. The linear layer 234 is a feed forward neural network that projects the vector of floating-point numbers of the hidden states into a logits vector. The logits vector is then input to the softmax layer 236 that generates a probability distribution for all the tokens in the model's vocabulary.

The softmax layer 236 performs a softmax function to normalize the output of the model into a probability distribution over the tokens/subtokens in the model's vocabulary. The softmax function takes as input a vector z of K real numbers, and normalizes it into a probability distribution consisting of K probabilities proportional to the exponentials of the input numbers. The softmax function applies the standard exponential function to each element of the input vector and normalizes these values by dividing the sum of these exponentials thereby ensuring that the sum of the output vector is 1. The softmax function σ is represented mathematically as follows:

$$\sigma: \mathbb{R}^K \rightarrow [0, 1]^K, \sigma(z)_i = \frac{e^{z_i}}{\sum_{j=1}^k e^{z_j}},$$

for $i = 1, \ldots K$ and $z = (z_1, \ldots, z_K) \in \mathbb{R}^K$.

The output of the softmax function is the output probabilities for each token/subtoken in the model's vocabulary.

The cost function component 222 estimates the loss or error which is used to compare how good or bad the predicted results Y' are compared with the ground truth, X. In one aspect, a cross-entropy loss function is used. Once the loss is calculated, it is propagated backwards to the hidden layers that contributed directly to the output which are in the user space and the model space.

In backpropagation, the partial derivatives of the loss function with respect to the trainable parameters (i.e., prefix embeddings) are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of prefix embeddings that minimizes the loss function. A backpropagation through time (BPTT) algorithm may be used to update the weights.

Attention now turns to a more detailed description of the deep learning model.

Neural Transformer Model

Figure 3:
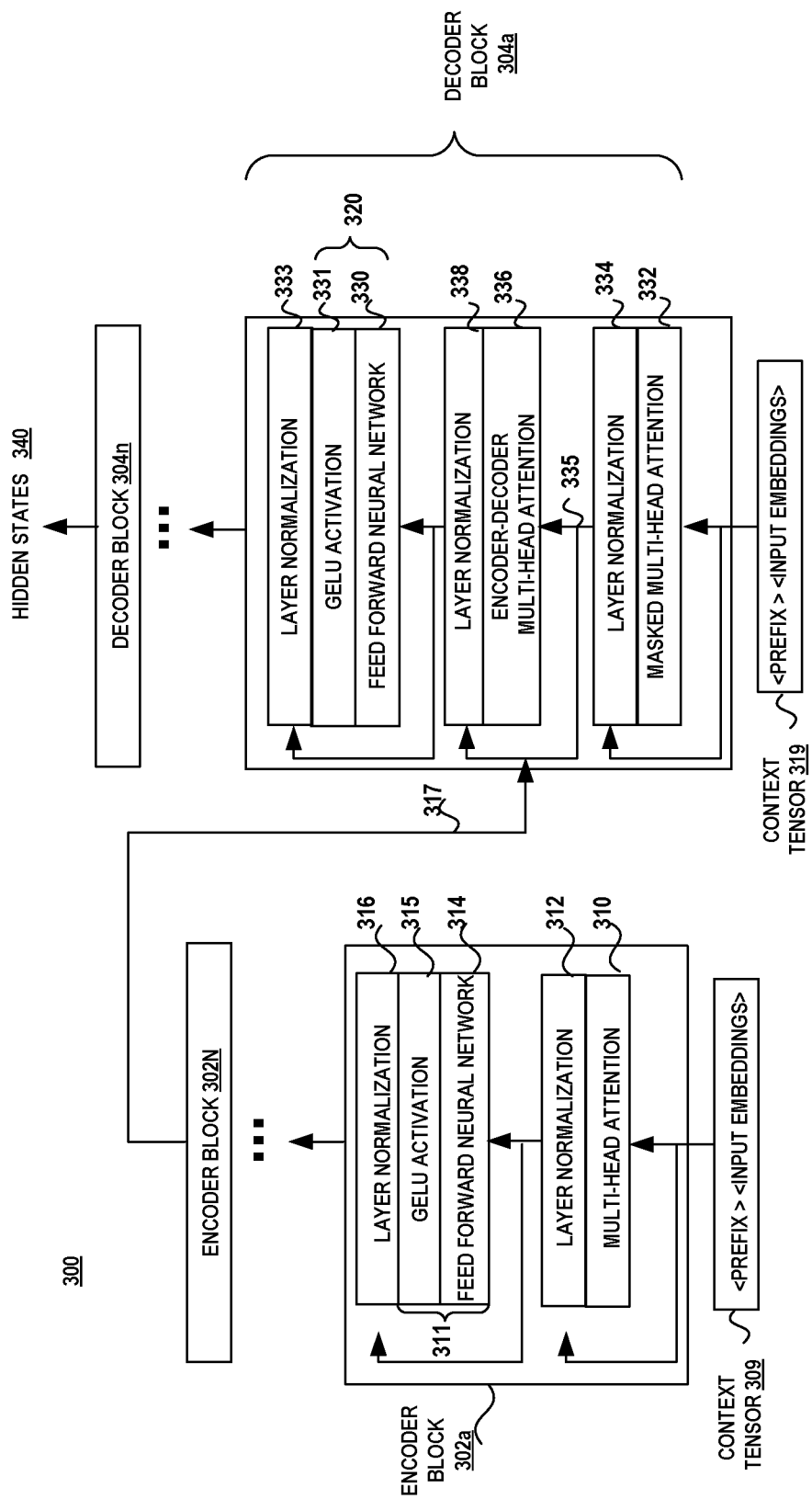
FIG. 3 is a schematic diagram illustrating an exemplary architecture of an encoder-decoder neural transformer model with attention.

In one aspect, the deep learning model is a neural transformer model with attention. FIG. 3 shows an exemplary structure of the neural transformer model with attention in an encoder-decoder configuration. The neural transformer model with attention 300 contains one or more encoder blocks 302a-302n ("302") and one or more decoder blocks 304a-304n ("304"). A tuning dataset consists of a pair of context tensors. The first encoder block 302a receives the context tensor 309 representing an input sequence in a first domain and the first decoder block receives a context tensor 319 representing the translated sequence in a second domain.

An encoder block 302 consists of two layers. The first layer includes a multi-head attention component 310 followed by layer normalization component 312. The second layer is a multilayer perceptron ("MLP") 311 including a feed forward neural network 314 followed by a Gaussian Error Linear Unit (GELU) activation layer 315 and then a layer normalization component 316. The context tensor 309 is input into the multi-head attention layer 310 of the first encoder block 302a with a residual connection to layer normalization 312. The output of the layer normalization 312 is input to the feed forward neural network 314 with another residual connection to layer normalization 316. The output of the encoder block 302 is a set of hidden representations. The set of hidden representations is then sent through additional encoder blocks, if multiple encoder blocks exist, or to the decoder 304.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction. In prefix-tuning, the model attends the prefixes with the subtokens of an input sequence.

The multi-head attention component 310 takes a context tensor 309 and weighs the relevance of each subtoken and prefix represented in the context tensor 309 to each other by generating weights for the prefix in the context tensor 309. The attention weights of the multi-head attention component 310 are frozen.

In order to reduce the training time of the neural transformer, layer normalization is used between the layers. The layer normalization component normalizes the inputs across the features. The mean and standard deviation is computed across the feature dimensions. There is a first layer normalization 312 that precedes the feed forward neural network 314 and a second layer normalization 316 that follows the feed forward neural network 314.

The feed-forward neural network 314 processes each output encoding separately. The GELU layer 315 is an activation function that scales the output of the feed-forward neural networks for the layer normalization layer. The GELU activation function 315 is defined as follows: GELU $(x)=0.5\times(1+\tanh(\sqrt{2}/\pi(x+0.044715x^3)))$. The GELU activation function 315 is used to achieve faster and better convergence that a sigmoid function and to avoid the vanishing gradient problem.

A decoder block 304 predicts each subtoken $t_i$ in the target language one-by-one at each time step conditioned on all previously-generated target subtokens $t_1, \ldots t_{i-1}$. The decoder block 304 consists of three layers. The first layer includes a masked multi-head attention component 332 followed by a layer normalization component 334. The output of the layer normalization component 334 is input into the encoder-decoder multi-head attention component 336 with a residual connection 335 to layer normalization component 338. The second layer includes an encoder-decoder multi-head attention component 336 followed by a layer normalization component 338. The output of layer normalization component 338 is input into the feed forward neural network 330 with a residual connection to layer normalization component 333. The third layer includes a multilayer perceptron 320 that includes a feed forward neural network 330 followed by GELU activation 331 and then a layer normalization component 333. The output from the last decoder block 304n is a set of hidden states 340.

The masked multi-head attention component 332 receives the output embeddings of the previous timestep. The masked multi-head attention component 332 masks the output embeddings from future time steps. The encoder-decoder multi-head attention layer 336 receives queries from the previous decoder layer and the encoder output 317 from the last encoder block 302n. In this manner, the decoder block 304 can attend to every position of the input sequence. The feed-forward neural network 330 processes each output encoding separately. A layer normalization component 334, 338, 333 is used between the layers in order to normalize the inputs across the features.

Attention now turns to a description of an exemplary method of prefix-tuning the neural transformer model described above.

Prefix-Tuning

The tuning of a neural transformer model is a process where the model learns which weights and biases (i.e., parameters) minimize a cost function which results in a better fitting model. In prefix-tuning, the weights and biases used in the various layers of the encoder and decoder blocks and the layers of the output layer are frozen while only the prefix embeddings are updated.

Figure 4A:
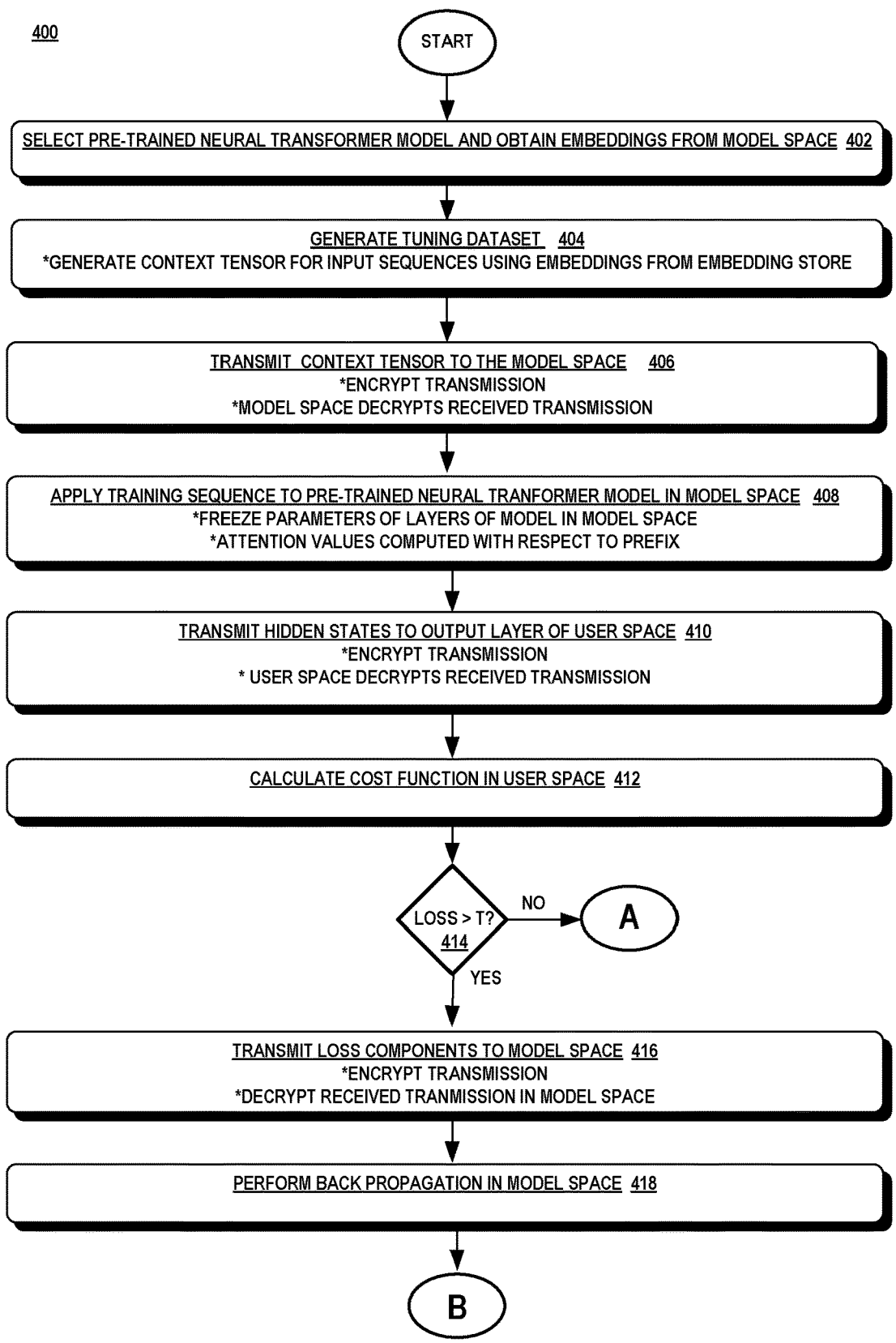
FIGS. 4A-4B are flow diagrams illustrating an exemplary method for prefix-tuning a custom model.

Turning to FIGS. 2 and 4A, there is shown an exemplary method 400 for prefix-tuning a neural transformer model with attention. Initially, a particular pre-trained model is selected and the pre-trained subtoken and positional embeddings, Ws and Wp, of the model are obtained from the model space and stored in the embedding store 230 of the user space 202 (block 402).

The tuning dataset 227 is then generated. The tuning dataset 227 consists of pairs of input sequences, wherein one part of the pair includes an input sequence of a first domain and the second part of the pair includes its corresponding translated sequence in a second domain. The sequences represent source code components, such as a source code method body, method docstring, method signature, unit test case, source code bug patch, and the like. Each input sequence of the pair is parsed into a concrete syntax tree from which sequences of tokens are extracted and encoded into subtokens. (Collectively, block 404).

A prefix consists of a set of indices, 0 . . . p, to locations in the embedding store 230. The prefix is prepended to the input sequence of tokens. Initially, the locations corresponding to the prefix are set to random values which are updated during the weight update phase. The value of p is a hyperparameter and is typically equal to a small fraction of the input sequence length. (Collectively, block 404).

The embedding store 230 stores a matrix $H^0 \in \mathcal{R}^{|X| \times dh}$ which is effectively split into two matrices: $H^0{}_p \in \mathcal{R}^{p \times dh}$ which contains the embeddings for the prefix 207 which are updated through backpropagation; and $\hat{H}^0 \in \mathcal{R}^{|X| \times dh}$ which contains the subtoken and positional embeddings of the pre-trained model, $W_s$, $W_p$, which are frozen, where |X| is the input sequence length, $d_h$ is the embedding dimension. (Collectively, block 404).

Each row j of $\hat{H}^0$ is obtained as $\hat{H}^0{}_j$=EmbeddingLookup$_{SUBTOKEN}$ ($x_j$, V)+EmbeddingLookup$_{POSITION}$ (j, P), where V is the vocabulary of subtokens, $x_j$ is a subtoken in |X| at position j, and P is the maximum sequence length or maximum positions in a sequence. Each token/subtoken in the input sequence is replaced with its respective subtoken embedding. EmbeddingLookup$_{subtoken}$ ($x_j$, V) returns the dimensional row, $d_h$, of the embedding matrix Ws that corresponds to $x_j$ and EmbeddingLookup$_{position}$(j, P) returns the dimensional row of the embedding matrix Wp that corresponds to the position j. A context tensor is formed by combining the sequence of subtoken embeddings with its corresponding positional embeddings and prepending the prefix. (Collectively, block 404).

The context tensor is then transmitted to the model space 204. In one aspect, the context tensor is encrypted before it is transmitted to the model space. The encryption method may employ any type of symmetric or asymmetric technique such as, without limitation, Advanced Encryption Standard (AES), Rivest-Shamir-Adleman (RSA), triple DES (Data Encryption Standard), Twofish, or the like. (Collectively, block 406).

Turning to FIG. 3, the model applies n transformer blocks (i.e., encoder blocks and decoder blocks) over the input embeddings to produce contextual representations: $H^n{}_p$=transformer$_n$($H^{n-1}$), n∈[1, N]. Each of the n transformer blocks include a multi-headed self-attention layer 310, 332, 336 followed by a multi-layer perceptron layer 311, 320 that includes a feed forward neural network layer 314, 330. Each of these layers is followed by a skip-connection and layer normalization operation, LayerNorm, 312, 316, 333, 334, 338. Specifically, for the n-th transformer block:

$$G_p^n = LayerNorm\left(MultiHeadAttn\left(H_p^{n-1}\right) + H_p^{n-1}\right)$$

$$H_p^n = LayerNorm\left(MLP\left(G_p^n\right) + G_p^n\right)$$

where MultHeadAttn is the operation of the multi-head self-attention layers 310, 332, 336, and MLP is the operation of the feed forward neural network layers 314, 330, and LayerNorm is the operation of the layer normalization layers 312, 316, 334, 338, 333.

For the n-th transformer layer, the multi-headed self-attention is parameterized with matrices $W_i^Q$, $W_i^K$, $W_i^V \in \mathbb{R}^{dh \times dk}$, which are used to linearly project the $H^{n-1}{}_p$ to obtain query, key and value matrices:

$$Q_i = H_p^{n-1} * W_i^Q, \; K_i = H_p^{n-1} * W_i^K, \; V_i = H_p^{n-1} * W_i^V.$$

The output of the multi-head attention operation is obtained as:

$$head_i = softmax\left(\frac{Q_i K_i^T}{\sqrt{d_K}} + M\right) V_i,$$

$$G^n = [head_1, head_2, \ldots head_u] \, W_n^O,$$

where the previous layer's output $H^{n-1}{}_p \in \mathcal{R}^{|X|-p \times dh}$ is linearly projected to a triplet of queries, Q, keys, K, and values, V, using model parameters $W_i^Q$, $W_i^K$, $W_i^V \in \mathbb{R}^{dh \times dk}$, respectively, where u is the number of self-attention heads, $d_k$ is the dimension of a head, and $W_n^O \in \mathcal{R}^{dh \times dh}$ are the model parameters, where $M \in \mathcal{R}^{dh \times dh}$ is a mask matrix, and where [ . . . ] represents a concatenation operation.

$G^n{}_p$ serves as input to MLP 311, 320 which includes a feed forward neural network layer 314, 330 and a GELU activation layer 315, 331. An MLP 311, 320 performs the computation $\hat{Z}^n = W_2^T GELU (W_1^T + b_1) + b_2$, where $W_1 \in \mathcal{R}^{dh \times dh}$, $W_2 \in \mathcal{R}^{4dh \times dh}$ are weight matrices parametrizing the MLP, where $b_1$ and $b_2$ are biases.

The output of the MLP layer which is also the output of an encoder block and decoder block is obtained by applying the skip-connection and layer normalization operation:

$$H_p^n = LayerNorm\left(\hat{Z}^n + G_p^n\right),$$

where the LayerNorm function is defined as:

$$LayerNorm\left(\hat{Z}^n, \gamma, \beta\right) = \gamma \frac{\hat{Z}^n - u_{\hat{Z}^n}}{\sigma_{\hat{Z}^n}} + \beta,$$

where $\gamma, \beta \in \mathcal{R}^d$, where $\gamma, \beta$ are biases and where $$u_{\hat{z}^n} = \frac{1}{k}\sum_{i=1}^{k}\hat{z}^{n_i},$$

and where $$\sigma_{\hat{z}^n} = \sqrt{\frac{1}{k}\sum_{i=1}^{k}(\hat{z}^{n_i} - \mu_{\hat{z}^n})^2}.$$

The tuning of the feed forward neural network 314, 330, consists of the forward pass, loss calculation $\mathcal{J}$, backward pass to extract the gradient of the loss function $\nabla \mathcal{J}$ over the trainable parameters via chain-rule differentiation and the weight update. The weight update is performed using the standard stochastic gradient descent formulation:

$$W^k = W^{k-1} - \lambda \nabla \mathcal{J}(W^{k-1}).$$

Turning to FIGS. 3 and 4A, the first encoder block 302a of the neural transformer model takes the first context tensor 309 of a pair as input and passes it through the multiple layers of multi-head attention 310, layer normalization 312, feed-forward neural network 314, GELU activation 315, and layer normalization 316 to finally produce a set of hidden representations. If there are additional encoder blocks, the output of each encoder block is passed onto the next encoder block with the output of the last encoder block producing the set of hidden representations 317. The set of hidden representations 317 is passed onto each decoder block. (Collectively, block 408).

The first decoder block of the model 304a takes the second context tensor 319 of the pair as input and passes it to the masked multi-head attention layer 332. Starting with the first token of the context tensor 319, the subtokens are passed through the self-attention 332 and normalization layer 334 and into the encoder-decoder attention layer 336, serving as the query for encoder-decoder attention, where the key and value pairs for the attention are the outputs of the last encoder block. (Collectively, block 408).

The feed forward neural networks in the encoder blocks 302 and the decoder blocks 304 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. (Collectively, block 408).

Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 408).

Turning to FIGS. 2 and 4A, the model outputs the hidden states of the last decoder block which are transmitted to the linear layer 234 in the user space 202. In one aspect, the hidden states are encrypted before being transmitted to the user space 202. (Collectively, block 410).

The linear layer 234 includes a fully connected neural network that transforms the hidden states into a larger vector, called logits vector, that has the same dimensions of the vocabulary size. Each value of the logit vector represents the score for each unique token in the vocabulary. Next, a standard softmax function is applied to the logits vector, to obtain a new vector, with same dimensions, where scores are converted into probabilities. Specifically, each score is transformed into a positive numerical value, such that the summation of all the values, along the entire vector, summed up to 1.0. (Collectively, block 410).

The cost function component 222 measures the performance of the model by computing a loss using a cost function. The cost function uses the predicted output 214 and the corresponding ground truth output 220. In an aspect, the cost function is a cross-entropy loss which is computed as follows: $\mathcal{L}(\Theta) = -\Sigma_{i=1}^{K} y_i \log(y_i')$, where $y_i$ is the ground truth token/subtoken at position i and $y'_i$ is the predicted token/subtoken at position i, K is the number of tokens/subtoken output. (Collectively, block 412).

When the loss meets the threshold, the tuning process is concluded and the model is deployed in an inference system. (block 414—no, block 426).

When the model is deployed in an inference system, the prefix embeddings are prepended to the input sequence. The prefix embeddings that are used are the embeddings generated during the tuning process. The input sequence uses the subtoken and positional embeddings from the pre-trained deep learning model. (Collectively, block 426).

When the loss exceeds a threshold $\tau$, the components of the loss calculation are transmitted to the model space. The error loss calculation components include the identity of the cost function algorithm, the predicted output Y', and the ground truth X. The error loss components are encrypted prior to the transmission (Collectively, block 414—yes, block 416).

The model uses the error loss calculation components to perform backpropagation where the gradients of the loss function are calculated with respect to the prefix weights in each respective layer of the model (block 418).

Figure 4B:
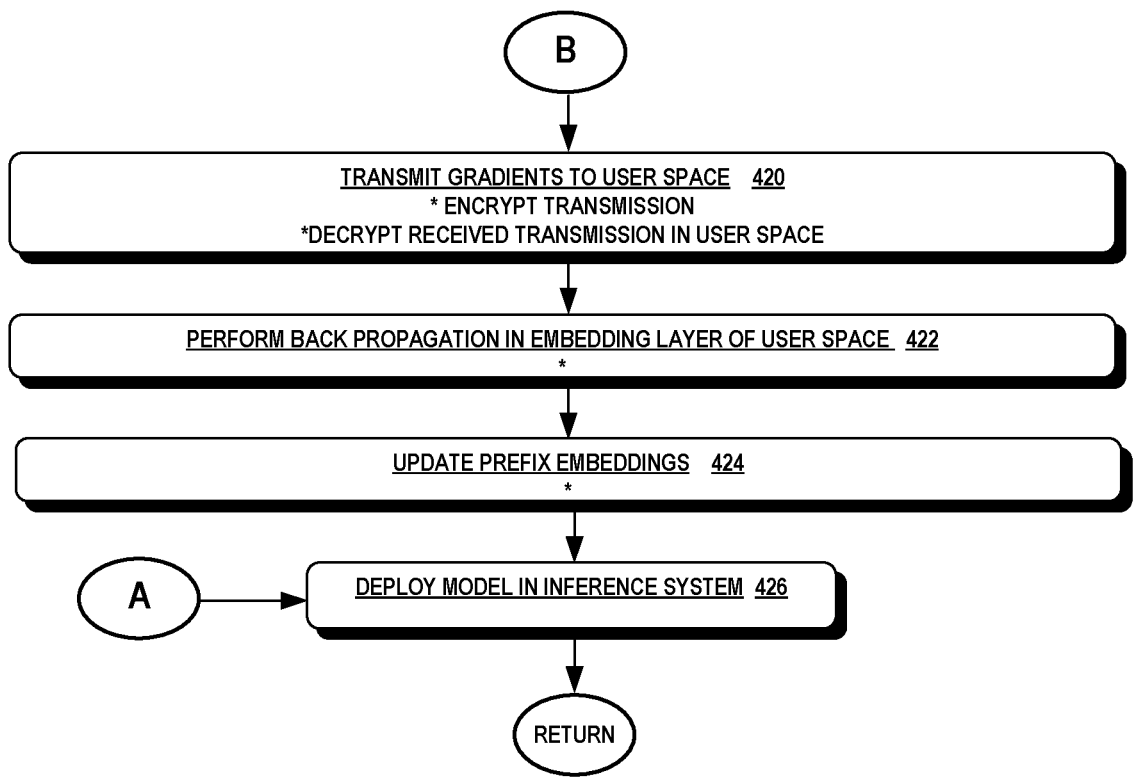

Turning to FIGS. 2 and 4B, the gradients of the loss function are computed by the model 208 and then transmitted, encrypted, to the user space 202 (block 420). The embedding engine 228 decrypts the gradients, performs backpropagation, and updates the prefix embeddings 207 (block 422-424).

Upon completion of the tuning process (block 414—no), the custom model is then deployed in an inference system to generate source code (block 426).

In one aspect, the model may be deployed in a web service or application that generates unit test cases given a context (e.g., method signature, docstring or method body). In another aspect, the model may be part of a source code editor or integrated development environment ("IDE"). The IDE may utilize a function where the model is utilized to generate a unit test cases automatically upon initiation of a particular user input. In another aspect, the model may be part of an application that generates unit test cases for source code that is uploaded into a source code repository. (Collectively, block 426).

Exemplary Operating Environment

Figure 5:
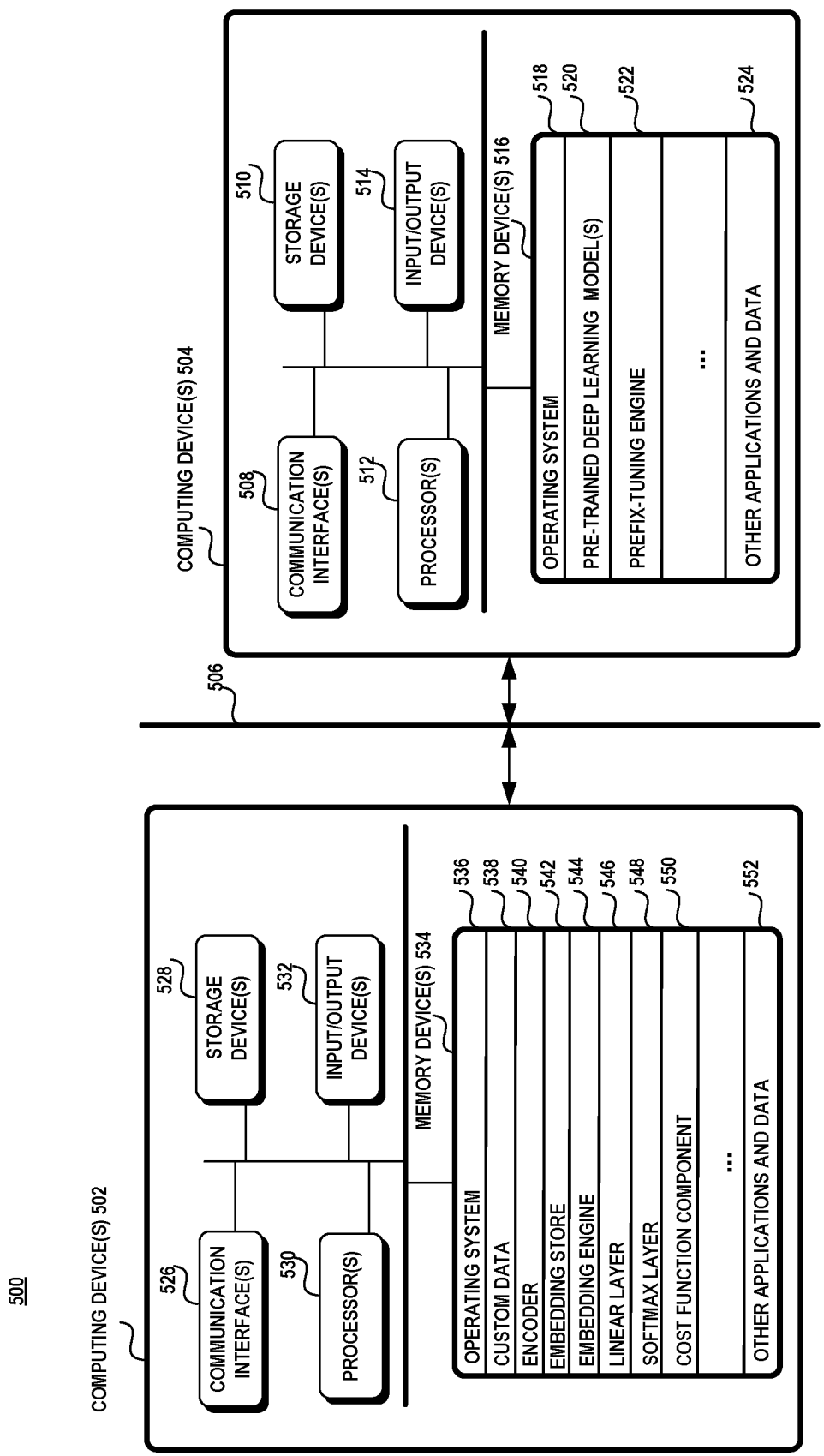
FIG. 5 is a block diagram illustrating an exemplary operating environment.

Attention now turns to a discussion of an exemplary operating environment 500. FIG. 5 illustrates an exemplary operating environment 500 in which the computing devices 502 of various users (e.g., developer, client, customer) interact with a cloud platform having one or more computing devices 504, through a network 506. However, it should be noted that the aspects disclosed herein is not constrained to any particular configuration of devices and that other configurations are possible.

The computing devices 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing devices 502, 504 may include one or more processors 512, 530, one or more communication interfaces 508, 526, one or more storage devices 510, 528, one or more input/output devices 514, 532, and one or more memory devices 516, 534. A processor 512, 530 may be any commercially available or customized processor and may include dual microprocessors and multi-processor architectures. A communication interface 508, 526 facilitates wired or wireless communications between the computing device 502, 504 and other devices. A storage device 510, 528 may be computer-readable medium that does not contain propagating signals, such as modulated data signals transmitted through a carrier wave. Examples of a storage device 510, 528 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 510, 528 in the computing devices 502, 504. The input/output devices 514, 532 may include a keyboard, mouse, pen, voice input device, touch input device, display, speakers, printers, etc., and any combination thereof.

A memory device or memory 516, 534 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 516, 534 may also include one or more external storage devices or remotely located storage devices that do not pertain to propagated signals, such as modulated data signals transmitted through a carrier wave.

The memory device 516 of computing device 504 may contain instructions, components, and data. A component is a software program that performs a specific function and is otherwise known as a module, program, component, engine, and/or application. The memory device 516 may include an operating system 518, pre-trained deep learning models 520, a prefix-tuning engine 522, and other applications and data 524.

The memory device 534 of computing device 502 may include an operating system 536, customer data 538, an encoder 540, an embedding store 542, an embedding engine 544, a linear layer 546, a softmax layer 548, cost function component 550, and other applications and data 552.

The computing devices 502, 504 may be communicatively coupled via a network 506. The network 506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

A system is disclosed comprising: a processor; and a memory that stores a program configured to be executed by the processor. The program includes instructions that when executed perform acts that: access a pre-trained deep learning model trained to generate source code, wherein the pre-trained deep learning model includes a plurality of model parameters; tune the pre-trained deep learning model to generate a first custom model through application of a first tuning dataset to the pre-trained deep learning model, wherein the first prefix includes a plurality of trainable parameters distinct from the plurality of model parameters, wherein the tuning of the pre-trained deep learning model optimizes the plurality of trainable parameters with the plurality of model parameters frozen; and output the first custom model for deployment in an inference system to generate source code.

In an aspect, the program includes instructions that when executed perform acts that: generate the first tuning dataset in an execution environment of a user space that is distinct from an execution environment of a model space, wherein the execution environment of the model space tunes the pre-trained deep learning model.

In an aspect, the program includes instructions that when executed perform acts that: compute an error loss from output generated from application of the first tuning dataset in the execution environment of the user space; and transmit to the model space the error loss to backpropagate to the pre-trained deep learning model.

In an aspect, the program includes instructions to perform acts that: update the plurality of trainable parameters in the user space based on backpropagated gradients received from the model space.

In an aspect, the first custom model is a sequence-to-sequence model that is trained to learn to translate source code of a first domain into source code of a second domain. In an aspect, the user space is in a first computing device and the model space is in a second computing device.

In an aspect, the program includes instructions to perform acts that: tune the pre-trained deep learning model to generate a second custom model through application of a second tuning dataset to the pre-trained deep learning model with the plurality of model parameters frozen, wherein the tuning of the pre-trained deep learning model optimizes a second prefix, wherein the second prefix includes a plurality of free parameters that differ from the plurality of model parameters, wherein the first prefix and the second prefix differ.

In an aspect, the pre-trained deep learning model is a neural transformer model with attention.

A computer-implemented method is disclosed, comprising: accessing a pre-trained deep learning model trained to generate source code given a context, wherein the pre-trained deep learning model includes a plurality of model parameters, wherein the pre-trained deep learning model includes an input layer, an output layer, and a plurality of transformer blocks; receiving, from the input layer, a tuning dataset of a target source code generation task, wherein the tuning dataset including a plurality of input sequences, an input sequence including a prefix prepended to source code samples, wherein the prefix includes a plurality of trainable parameters; applying the tuning dataset to the plurality of transformer blocks to create a custom model for the target source code generation task, wherein application of the tuning dataset optimizes the prefix to minimize a cost function without altering the model parameters; and outputting the custom model to generate source code for the target source code generation task.

In an aspect, the input layer and the output layer are in a first execution environment, wherein the plurality of transformer blocks are in a second execution environment and the first execution environment differs from the second execution environment. In an aspect, the first execution environment includes a first computing device, the second execution environment includes a second computing device, and the first computing device coupled to the second computing device via a network.

In an aspect, the computer-implemented method further comprises: generating, from the plurality of transformer blocks, an output from application of the tunning dataset; and computing, in the output layer, an error loss from minimization of the cost function from an output of application of the tuning dataset.

In an aspect, the computer-implemented method further comprises: generating, in the input layer, embeddings for the prefix and embeddings for the source code, wherein the embeddings for the source code are obtained from the pre-trained deep learning model and frozen during the tuning.

In an aspect, the computer-implemented method further comprises: backpropagating the error loss to the plurality of transformer blocks; and updating, in the input layer, embeddings for the prefix based on the backpropagated error loss.

In an aspect, the pre-trained deep learning model is a neural transformer model with attention. In an aspect, the plurality of transformer blocks includes at least one encoder block and at least one decoder block.

A system is disclosed comprising: a processor and a memory. The memory includes instructions that when executed on the processor perform actions that: provide, in a model space, a pre-trained deep learning model trained to generate source code, wherein the pre-trained deep learning model includes a plurality of model parameters; generate, in a user space, a custom tuning dataset to tune the pre-trained deep learning model for a target source code generation task, wherein the custom tuning dataset includes a plurality of input sequences, an input sequence including a prefix and a source code sample, wherein the prefix includes at least one trainable parameter; apply, in the model space, the tuning dataset to the pre-trained deep learning model to generate a custom model for the target source code generation task, wherein the pre-trained deep learning model learns to optimize the prefix with the plurality of model parameters frozen; compute, in the user space, an error loss from output of the application of a select one of the plurality of input sequences and a ground truth output; backpropagate, to the model space, the error loss to the pre-trained deep learning model; backpropagate, to the user space, gradients computed from the model space; update, in the user space, embeddings of the prefix based on the backpropagated gradients; and output the custom model, wherein the user space and the model space are in separate execution environments.

In an aspect, the memory includes instructions that when executed on the processor perform actions that: utilize the embeddings of the prefix in an input sequence that is applied to the custom model for generation of source code for the target source code generation task. In an aspect, the pre-trained deep learning model includes a neural transformer model with attention. In an aspect, the user space and the model space are in separate computing devices.

What is claimed:
1. A system comprising:
a processor; and
a memory that stores a program configured to be executed by the processor, the program comprises instructions that when executed perform acts that:
obtain, in a local execution environment, a pre-trained deep learning model trained to perform a first source code generation task, wherein the pre-trained deep learning model comprises a plurality of transformer blocks, wherein the plurality of transformer blocks comprises a plurality of model parameters;

receive, from a remote execution environment, tuning data to tune the pre-trained deep learning model to perform a second source code generation task, wherein the tuning data comprises a plurality of trainable parameters and source code samples, wherein the plurality of trainable parameters is separate from the plurality of model parameters;

tune, in the local execution environment, the pre-trained deep learning model to learn to perform the second source code generation task through application of the tuning data to the plurality of transformer blocks, wherein the plurality of model parameters is kept frozen and the plurality of trainable parameters are updated in the plurality of transformer blocks, wherein the local execution environment differs from the remote execution environment;

output hidden states from a last transformer block of the plurality of transformer blocks to the remote execution environment;

receive from the remote execution environment an error loss obtained from the outputted hidden states; and update the plurality of trainable parameters in each of the plurality of transformer blocks based on the error loss.

2. The system of claim 1, wherein the program comprises instructions that when executed perform acts that:

output gradients of the error loss to the remote execution environment.

3. The system of claim 2, wherein the program comprises instructions that when executed perform acts that:

associate an embedding with each of the plurality of trainable parameters; and update, in the remote execution environment, the embedding for each of the plurality of trainable parameters based on the gradients of the error loss.

4. The system of claim 3, wherein the tuning data comprises a sequence of embeddings representing a training sample.

5. The system of claim 1, wherein the tuning data is received encrypted, and wherein the program comprises instructions that when executed perform acts that:

decrypt the encrypted tuning data before tuning the pre-trained deep learning model.

6. The system of claim 1, wherein the error loss is received encrypted, wherein the program comprises instructions that when executed perform acts that:

decrypt the error loss prior to the update of the trainable parameters in each of the plurality of transformer blocks.

7. The system of claim 1, wherein the program comprises instructions to perform acts that:

prior to the output of the hidden states from the last transformer block, encrypt the hidden states.

8. The system of claim 2, wherein the program comprises instructions to perform acts that:

prior to the output of the gradients of the error loss to the remote execution environment, encrypt the gradients of the error loss.

9. A computer-implemented method performed in a model space, comprising:

deploying a pre-trained deep learning model trained to generate source code for a first task, wherein the pre-trained deep learning model comprises a plurality of model parameters;

receiving, from a user space, a tuning dataset to tune the pre-trained deep learning model to learn to perform a second task, wherein the tuning dataset comprises a plurality of input sequences, wherein an input sequence of the plurality of input sequences comprises a prefix prepended to a source code sample, wherein the prefix comprises a plurality of trainable parameters, wherein the user space differs from the model space;

tuning the pre-trained deep learning model to create a custom model for the second task, wherein the tuning applies each input sequence of the plurality of input sequences to the pre-trained deep learning model to optimize weights of the prefix without altering the plurality of model parameters;

sending, to the user space, output from the application of each input sequence of the plurality of input sequences;

receiving, from the user space, an error loss based on the output from the application of each input sequence of the plurality of input sequences; and updating the weights of the prefix based on the error loss.

10. The computer-implemented method of claim 9, further comprising:

computing gradients of the error loss; and sending, to the user space, the gradients of the error loss.

11. The computer-implemented method of claim 10, further comprising:

associating an embedding with each of the plurality of trainable parameters; and updating, in the user space, the embedding of each of the plurality of trainable parameters based on the gradients.

12. The computer-implemented method of claim 9, further comprising:

wherein the plurality of input sequences is encrypted; and prior to the tuning with the plurality of input sequences, decrypting the plurality of input sequences.

13. The computer-implemented method of claim 9, further comprising:

prior to sending, to the user space, the output from the application of the input sequence of the plurality of input sequences, encrypting the output.

14. The computer-implemented method of claim 9, further comprising:

wherein the error loss is encrypted by the user space; and prior to updating the prefix based on the error loss, decrypting the error loss.

15. The computer-implemented method of claim 10, further comprising:

prior to sending the gradients to the user space, encrypting the gradients.

16. A hardware storage device having stored thereon computer executable instructions that are structured to be executable by a processor of a computing device to thereby cause the computing device to perform actions that:

provide a first execution environment that comprises a pre-trained deep learning model and a prefix-tuning engine, wherein the pre-trained deep learning model comprises a plurality of model parameters, wherein the pre-trained deep learning model is trained to perform a first source code generation task;

provide a second execution environment that comprises tuning data, an embedding engine and a cost function component, wherein the first execution environment differs from the second execution environment;

wherein the first execution environment receives from the second execution environment the tuning data to tune the pre-trained deep learning model to perform a second source code generation task, wherein the tuning data comprises a plurality of trainable parameters and source code samples, wherein the plurality of trainable parameters is separate from the plurality of model parameters, wherein the prefix-tuning engine tunes the pre-trained deep learning model to learn to perform the second source code generation task through application of the tuning data to the pre-trained deep learning model, wherein the prefix-tuning engine keeps the plurality of model parameters frozen and updates the plurality of trainable parameters, wherein the prefix-tuning engine outputs hidden states from the tuning of the pre-trained deep learning model to the second execution environment for the cost function component to compute an error loss from the output hidden states of the pre-trained deep learning model on the tuning data, and wherein the pre-tuning engine updates the plurality of trainable parameters of the pre-trained deep learning model based on the error loss.

17. The hardware device of claim 16, having stored thereon computer executable instructions that are structured to be executable by the processor of the computing device to thereby cause the computing device to perform actions that:
  determine, by the prefix tuning engine, gradients of a loss function with respect to weights of the plurality of trainable parameters based on the error loss; and
  transmit, by the prefix tuning engine, the gradients to the embedding engine.

18. The hardware device of claim 17, having stored thereon computer executable instructions that are structured to be executable by the processor of the computing device to thereby cause the computing device to perform actions that:
  update, by the embedding engine, embeddings of the plurality of trainable parameters based on the gradients.

19. The hardware device of claim 16, wherein the tuned pre-trained deep learning model is part of an integrated development environment.

20. The hardware device of claim 16, wherein the pre-trained deep learning model is a neural transformer model with attention.

* * * * *